Aug. 18, 1964     E. WYGASCH ETAL     3,145,130
DRUM DRYING PROCESS FOR RECOVERING
CONCENTRATED SODIUM HYDROSULFIDE
Filed Sept. 21, 1961
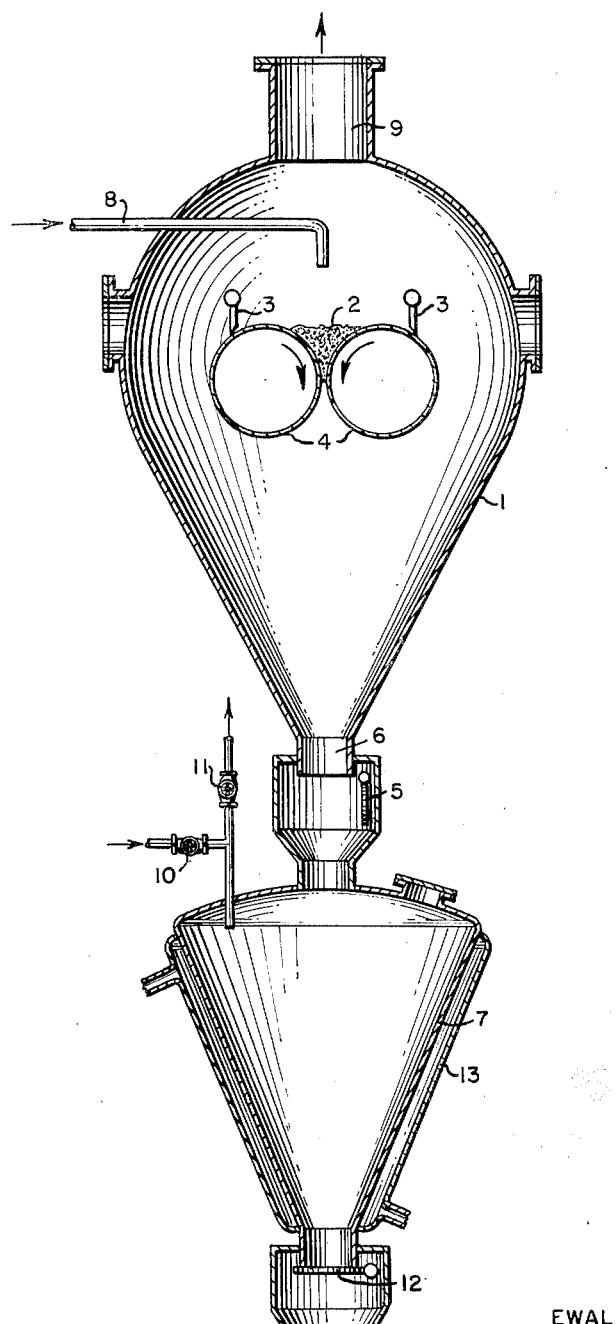
INVENTORS
EWALD WYGASCH
HELMUT ZAHN
WERNER HUEHN
BY
ATTORNEYS

United States Patent Office 3,145,130
Patented Aug. 18, 1964

3,145,130
DRUM DRYING PROCESS FOR RECOVERING CONCENTRATED SODIUM HYDROSULFIDE
Ewald Wygasch, Helmut Zahn, and Werner Huehn, Ludwigshafen (Rhine), Germany, assignors to Badische Anilin- & Soda-Fabrik Aktiengesellschaft, Ludwigshafen (Rhine), Germany
Filed Sept. 21, 1961, Ser. No. 139,597
Claims priority, application Germany Sept. 27, 1960
1 Claim. (Cl. 159—49)

The present invention relates to a process for the recovery of high-percentage dry sodium hydrosulfide from its aqueous solutions by evaporation.

Sodium hydrosulfide is available on the market as an about 30% aqueous solution and as a water-containing solid with a content of about 70% of NaHS melted down or in flakes. Although for many years there has been a strong demand for an anhydrous product, it has been necessary to sustain all the disadvantages of the said products containing considerable amounts of water, such as increased storage and transport costs, difficulties of dosage in the case of melted down products as well as limited applicability, because the known methods for the production of high-percentage products have not been adopted by industry.

For example, a method for the production of an anhydrous pulverulent sodium hydrosulfide is known according to which hydrogen sulfide free from oxygen is passed over solid sodium sulfide at 300° C., sodium hydrosulfide being formed according to the equation:

$$Na_2S + H_2S = 2NaHS$$

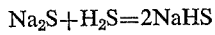

This method is attended by considerable difficulty as regards apparatus, yields only a very impure product and is therefore not used. The known reaction of sodium alcoholates dissolved in alcohol with hydrogen sulfide according to the equation:

$$RONa + H_2S = NaHS + ROH$$

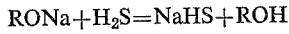

and subsequent washing of the precipitated sodium hydrosulfide with ether has not acquired any practical importance by reason of the troublesome handling involved.

The method which would appear to be the most simple for the preparation of anhydrous sodium hydrosulfide, namely by evaporation of a dilute solution of sodium hydrosulfide obtained by reaction of hydrogen sulfide with aqueous caustic soda solution, has hitherto not been carried out by reason of the difficulties encountered. These difficulties are due to the fact that with increasing concentration a crystal slurry occurs which, for complete drying, must be heated for a prolonged period of time at temperatures which lie considerably above 100° C. In these circumstances, it is impossible to avoid decomposition of the salt with the splitting off of hydrogen sulfide and formation of sodium sulfide. At these temperatures, in contact with oxygen, the salt moreover undergoes rapid oxidative decomposition to sulfur, polysulfide, thiosulfate, sulfite and sulfate.

We have now found that high-percentage sodium hydrosulfide can be obtained in a simple way from dilute aqueous solutions of sodium hydrosulfide by first preconcentrating the solution to a sodium hydrosulfide content of 75 to 85% under reduced pressure in the feed reservoir of a vacuum double-drum drier with top feed and then evaporating the remaining water from the resultant crystal slurry on the drums, concentration on the drums being discontinued before the temperature of the product on the drums exceeds the range of 100° to 105° C.

The concentration of the solution to be introduced into the feed reservoir may vary within wide limits. Obviously, it is expedient to use a solution of the highest possible concentration, for example one with a sodium hydrosulfide content of more than 50%. The preconcentration of the solution in the feed reservoir to the said sodium hydrosulfide content of 75 to 85% may be carried out, with constant feed, by varying the speed of rotation of the drums, the temperature of the drums and/or the pressure. The crystal slurry formed in the feed reservoir is applied in a thin layer to the surface of the two drums, where the remaining water is rapidly evaporated. According to the invention, drying is discontinued before the temperature of the product on the surface of the drums exceeds the range of 100° to 105° C. For this purpose, the heating temperature and the pressure are so adjusted that the product, immediately before it exceeds the said temperature range above which it becomes tough-plastic, is removed by the scrapers. If due regard is not paid to this circumstance, i.e., if the product remains longer than specified on the surface of the drums, great difficulties are encountered which make trouble-free continuous operation impossible. In particular, the viscous product formed can no longer be scraped off the drums without trouble, so that a very firmly adherent coating remains on the drums even when very hard, highly polished, corrosion-resistant metal surfaces are used. Moreover, the product deposits beneath the scrapers. These viscous deposits of product exert an extremely strong braking action on the drums causing the drums to stop within a short time. Moreover, the product rolls up on the scrapers to large viscous lumps which clog the discharge means.

The apparatus which is illustrated in the drawing includes two drying drums 4 which rotate in opposite directions. The drums are in a pear-shaped housing 1 which can be closed at the bottom by valve 5. The vapors which are formed during the evaporation can be withdrawn through outlet 9. The solution to be concentrated is introduced into the feed reservoir 2 through line 8. The feed reservoir is formed by drying drums 4 and by side plates which are not shown in the drawing. The crystal slurry is passed on the drums which rotate in the directions indicated by the arrows and are heated internally by steam. The dried product is removed from the drums by means of scrapers 3. The produce passes through outlet 6 which can be closed by valve 5 and trickles into bin 7 which is cooled externally with water and which is provided with closure means. From bin 7 the material is removed batchwise by closure of valve 5 and opening of valve 12. After bin 7 is empty, valve 12 is closed. By opening valve 11, bin 7 is evacuated until the pressure in container 1 is reached. After closing valve 11, valve 12 is opened and nitrogen is supplied through valve 10. The bin is refilled by closing valve 12 and opening valve 5.

It has further proved to be advantageous to cool rapidly the still warm product which has been scraped off in order to avoid agglomeration. This may be achieved by cooling with water all the surfaces of the product discharge means which come into contact with the product. This can be accomplished by providing bin 7 with a jacket 13 through which a cooling liquid such as water is passed. To avoid condensation of vapors on the cooled parts of the apparatus, inert gas may be blown in in countercurrent to the dry product which is trickling down.

The invention is illustrated by, but not limited to, the following example.

*Example*

108 kilograms per hour of a 62% aqueous sodium hydrosulfide solution is supplied at a heating steam pressure of 2.0 atmospheres gage (132.9° C.) to the feed reservoir of a vacuum double-drum drier with top feed having a total drum surface of 7.2 square meters and an effective drying surface of 4.6 square meters. The drums rotate at a speed of 1.8 r.p.m. and the pressure in the drier is maintained at 90 to 95 mm. Hg. The solution in the reservoir thickens to a crystal slurry with a content of about 80% of sodium hydrosulfide, and the slurry is then dried on the drums to give 70 to 72 kilograms per hour of a 94 to 96% solid product. The dry product scraped off from the drums as a free-flowing coarse powder contains less than 0.5% of disodium sulfide formed by decomposition.

What we claim is:

A process for the recovery of high-percentage sodium hydrosulfide from dilute aqueous solutions of sodium hydrosulfide which comprises passing the solution into the feed reservoir of a double-drum drier maintained at a pressure less than atmospheric pressure and having a top feed wherein said solution is preconcentrated to a sodium hydrosulfide content of 75 to 85% whereby a crystal slurry is formed, applying said slurry in a thin layer to the heated surfaces of the two drums of said double-drum drier whereon substantially all of the remaining water is evaporated from said slurry, and discontinuing said drying on said drums after the moisture content of said slurry has been reduced to no greater than about 6% and before the temperature of said dried product on said drums exceeds a temperature of from about 100° C. to 105° C.

References Cited in the file of this patent

UNITED STATES PATENTS

| | | |
|---|---|---|
| 1,048,463 | Merrell et al. | Dec. 24, 1912 |
| 1,608,147 | Vierling | Nov. 23, 1926 |
| 1,843,767 | Heath | Feb. 2, 1932 |
| 2,087,788 | Thal | July 20, 1937 |
| 2,142,983 | Thurman | Jan. 3, 1939 |
| 2,886,101 | Overton | May 12, 1959 |

FOREIGN PATENTS

| | | |
|---|---|---|
| 499,684 | Canada | Feb. 2, 1954 |